(12) United States Patent
Yamashita (10) Patent No.: US 6,588,276 B2
(45) Date of Patent: Jul. 8, 2003

(54) ACCELERATION SENSOR

(75) Inventor: Muneharu Yamashita, Toyama-ken (JP)

(73) Assignee: Murata Manufacturing Co., Ltd., Kyoto (JP)

(*) Notice: Subject to any disclaimer, the term of this patent is extended or adjusted under 35 U.S.C. 154(b) by 17 days.

(21) Appl. No.: 10/054,858

(22) Filed: Jan. 25, 2002

(65) Prior Publication Data

US 2002/0170356 A1 Nov. 21, 2002

(30) Foreign Application Priority Data

Feb. 19, 2001 (JP) .................................. 2001-042130

(51) Int. Cl.[7] .............................................. G01P 15/09
(52) U.S. Cl. ................................................... 73/514.34
(58) Field of Search ....................... 73/514.34; 310/311

(56) References Cited

U.S. PATENT DOCUMENTS 6,098,460 A * 8/2000 Otsuchi et al.
6,148,671 A * 11/2000 Nakamizo et al. ........ 73/514.34

FOREIGN PATENT DOCUMENTS

| JP | 8-105912 | 4/1996 |
|---|---|---|
| JP | 8-297138 | 11/1996 |
| JP | 27805942 | 5/1998 |
| JP | 3072354 | 6/2000 |
| JP | 2000-206139 | 7/2000 |
| JP | 2000-266776 | 9/2000 |

* cited by examiner

Primary Examiner—Richard A. Moller
(74) Attorney, Agent, or Firm—Keating & Bennett, LLP (57) ABSTRACT

An acceleration sensor includes a bridge circuit including two capacitors and two piezoelectric vibrators on which reverse stresses are exerted by acceleration, and a voltage-dividing impedance circuit provided between a second junction point and a third junction point. The signal of a voltage-dividing point of the voltage-dividing impedance circuit is fed back to a first junction point, so that an oscillation circuit is provided. An oscillating-output phase difference between the second and third junction points is detected by a phase-difference-signal processing circuit and is output as an acceleration-detection signal.

20 Claims, 12 Drawing Sheets

ACCELERATION SENSOR

BACKGROUND OF THE INVENTION

1. Field of the Invention

The present invention relates to an acceleration sensor including a piezoelectric vibrator on which stress caused by acceleration is exerted.

2. Description of the Related Art

Known acceleration sensors including piezoelectric vibrators are disclosed in the following publications:

(1) Japanese Patent No. 2780594 (Vibrator Acceleration Meter);

(2) Japanese Unexamined Patent Application Publication No. 2000-266776 (Amplifying Circuit For Piezoelectric Acceleration Sensors);

(3) Japanese Unexamined Patent Application Publication No. 2000-206139 (Acceleration Detector Provided With Piezoelectric Acceleration Sensors);

(4) Japanese Patent No. 3072354 (Vibrator Acceleration Meter);

(5) Japanese Unexamined Patent Application Publication No. 8-105912 (Acceleration Sensor); and (6) Japanese Unexamined Patent Application Publication No. 8-297138 (Piezoelectric Acceleration Sensor).

These publications are hereinafter referred to as "Publication 1" to "Publication 6".

In general, an acceleration sensor including a piezoelectric vibrator is relatively small. Thus, the acceleration sensor has superior applicability for various uses and has a high utility value.

The vibrator acceleration meter in Publication 1 has been used as a small-sized, surface-mountable acceleration sensor. It is used as a shock sensor for hard disk drives, and as an acceleration sensor for air bags. As described above, the acceleration sensor is used for various electronic devices. As its utility value has been realized, it has been used in new ways, such as a seismometer, an inclinometer, and a rotation-detecting acceleration sensor. Accordingly, an inexpensive acceleration sensor is needed which detects acceleration of gravity and acceleration having a low frequency of several hertz or less.

The devices described in Publications 2 and 3 are low-frequency-acceleration detecting circuits used as a sensor disclosed in Publication 1, and require high-resistance resistors and special operational amplifiers. This causes a problem in that it is difficult to make the devices disclosed in Publication 2 or Publication 3 as an integrated circuit (IC), and the cost increases. Also, the devices in Publications 2 and 3 have a defect in that acceleration of gravity cannot be detected because piezoelectric effect is used to detect an acceleration signal.

The devices described in Publications 4 and 5 detect acceleration of gravity since they detect an acceleration caused change in the resonant characteristics of a piezoelectric vibrator. However, the device described in Publication 4 is more expensive because it includes a crystal vibrator, and the device disclosed in Publication 5 has an increased size because it includes a bimorph piezoelectric vibrator.

Accordingly, to enable detection of low-frequency acceleration and acceleration of gravity, it is possible to make an acceleration sensor having a resonant circuit and two piezoelectric vibrators on which reversely directional stresses are exerted by acceleration. This acceleration sensor must include piezoelectric vibrators. When a circuit disclosed in Publication 5 or Publication 6 is simply applied to the piezoelectric vibrators, the following problems occur:

(i) The ratio between the impedance of an external resistor and the impedance of a piezoelectric vibrator is used as a signal. Thus, when the resonant frequency is high, the capacitance (component which is not changed by acceleration) of the piezoelectric vibrator operates to lower the impedance. Accordingly, this reduces the sensitivity of the impedance component that is not changed by acceleration.

(ii) Although a method of amplifying an amplitude signal is used, a special circuit (active elements) is required to accurately amplify a voltage having a high frequency of several megahertz to several tens of megahertz, such that the required cost increases. In addition, it is difficult to make the circuit as an IC.

(iii) To amplify a voltage having a high frequency of several megahertz to several tens of megahertz, the parasitic capacitance of a circuit substrate must be controlled. Accordingly, after the circuit and its elements are integrated (module structure), the sensitivity must be adjusted, and the adjustment of only the elements cannot guarantee the desired characteristics.

(iv) The parasitic capacitance of the circuit substrate changes due to contamination on the substrate, humidity, and deterioration of the substrate. Accordingly, to ensure reliability, coating or hermetic sealing packaging is required.

(v) An acceleration signal is output in the form of an amplitude modulated (AM) waveform. Thus, it is difficult to increase the precision of AM demodulation at high frequencies, such that the required circuit is complex.

SUMMARY OF THE INVENTION

To overcome the above-described problems, preferred embodiments of the present invention provide a small-sized, inexpensive acceleration sensor which detects low frequency acceleration and acceleration of gravity without experiencing problems described above.

According to a preferred embodiment of the present invention, an acceleration sensor preferably includes first and second piezoelectric vibrators in which reverse stresses are generated by acceleration, a bridge circuit which includes a first impedance circuit including the first piezoelectric vibrator, a second impedance circuit including the second piezoelectric vibrator, a first load impedance circuit including a first capacitor, and a second load impedance circuit including a second capacitor, and in which the first impedance circuit and the second impedance circuit are connected to a first junction point, the first impedance circuit and the first load impedance circuit are connected to a second junction point, the second impedance circuit and the second load impedance circuit are connected to a third junction point, and the first load impedance circuit and the second load impedance circuit are connected to a fourth junction point having a potential used as a reference potential, a voltage-dividing impedance circuit provided between the second junction point and the third junction point, a feedback-signal processing circuit for feeding back the signal of a voltage-dividing point of the voltage-dividing impedance circuit to the first junction point, wherein an oscillating circuit is arranged, and a phase-difference-signal processing circuit which detects an oscillation-output-phase difference between the second junction point and the third junction point and which outputs an acceleration-detection signal.

In the acceleration sensor, the piezoelectric-vibrator-included impedance circuit and the capacitor-included impedance circuit may be substituted for one another.

Preferably, the feedback-signal processing circuit includes an amplifier for amplifying the signal of the voltage-dividing point and a phase-shift circuit for shifting the phase of the feedback signal.

The voltage-dividing impedance circuit is preferably a voltage-dividing circuit defined by connecting a plurality of resistors in series.

The phase-difference-signal processing circuit includes a first phase-difference detecting circuit which detects a phase difference between a reference signal and the signal of the second junction point while using the signal of the voltage-dividing point as the reference signal, a second phase-difference detecting circuit which detects a phase difference between the reference signal and the signal of the third junction point, and a differential amplification circuit for performing differential amplification on the outputs of the first and second phase-difference detecting circuits.

Alternatively, the phase-difference-signal processing circuit may include a first phase-difference detecting circuit which detects a phase difference between a reference signal and the signal of the second junction point while using the signal of the first junction point as the reference signal, a second phase-difference detecting circuit which detects a phase difference between the reference signal and the signal of the third junction point, and a differential amplification circuit for performing differential amplification on the outputs of the first and second phase-difference detecting circuits.

Alternatively, the phase-difference-signal processing circuit may include a first phase-difference detecting circuit which detects a phase difference between a reference signal and the signal of the second junction point while the signal of the sixth junction point to which the phase-shift circuit and the amplifying circuit in the feedback-signal processing circuit are connected is used as the reference signal, a second phase-difference detecting circuit which detects a phase difference between the reference signal and the signal of the third junction point, and a differential amplification circuit for performing differential amplification on the outputs of the first and second phase-difference detecting circuits.

The acceleration sensors may further include a phase adjusting circuit for adjusting the phase of the reference signal which is input to the first and second phase-difference detecting circuits.

The oscillation circuit is classified as an LC-resonance oscillation circuit which uses the inductive component in the range of between the resonant frequency and the anti-resonant frequency of a piezoelectric vibrator and a capacitor. The oscillation circuit is not substantially affected by the parasitic capacitance of a circuit substrate because capacitors having relatively large capacitance are used as loads. Accordingly, high reliability is ensured without using coating or hermetic sealing packaging. In addition, the desired characteristics of the acceleration sensor as a single device are achieved.

According to the above-described structure, no deterioration in sensitivity occurs due to a high frequency because the sensitivity increases in proportion to the Q value of the resonance. Thus, desired detection sensitivity is obtained, even if small piezoelectric vibrators are used, such that the entire acceleration sensor is substantially reduced in size.

The phase-difference detecting circuit is defined by a binary logic circuit because it detects a phase change, such that it is suitable to be used in high frequency ranges. Accordingly, it can be inexpensively produced as an IC, even when the resonant frequency is set in the range of, for example, several megahertz to tens of megahertz.

Both the bridge circuit and phase-difference-signal processing circuit in the oscillation circuit are differential types. Thus, noise components having the same phase and characteristic changes caused in circuits are cancelled.

When the acceleration sensor is constructed as an IC, additional advantages are obtained because the relative variation of each element of the IC is very small. Thus, the circuit configuration of the acceleration sensor is suited for the IC structure.

In an acceleration sensor according to preferred embodiments of the present invention, a phase adjusting circuit is provided at the input side of the first and second phase-difference detecting circuits. The phase adjusting circuit is used for optimizing the phases of the reference signals, which greatly increases the precision of detecting acceleration.

Other features, elements, characteristics and advantages of the present invention will become more apparent from the following detailed description of the preferred embodiments thereof with reference to the attached drawings.

DETAILED DESCRIPTION OF PREFERRED EMBODIMENTS

The structure of an acceleration sensor according to a first preferred embodiment of the present invention is described below with reference to FIG. 1.

Figure 1:
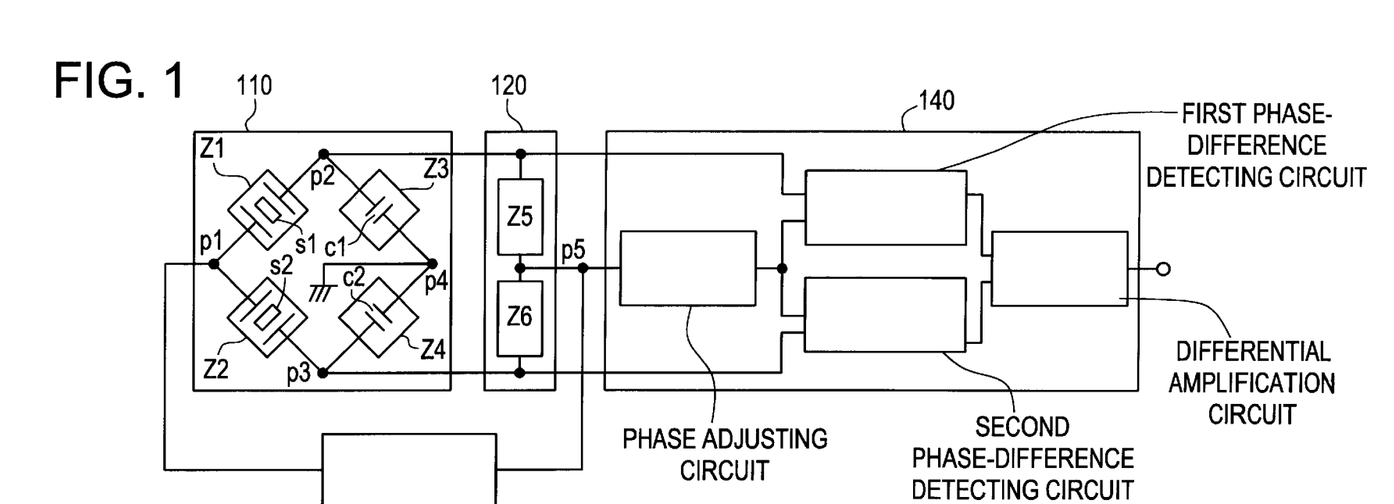
FIG. 1 is a block diagram showing an entire acceleration sensor according to a first preferred embodiment of the present invention.

FIG. 1 is a block diagram showing the entire acceleration sensor. The acceleration sensor includes a bridge circuit 110, a voltage-dividing impedance circuit 120, a feedback-signal processing circuit 130, and a phase-difference-signal processing circuit 140.

The bridge circuit 110 includes an impedance circuit Z1 including a piezoelectric vibrator s1, an impedance circuit Z2 including a piezoelectric vibrator s2, a load impedance circuit Z3 including a capacitor C1, a load impedance circuit Z4 including a capacitor C2. The circuits Z1 and Z2 are connected to a junction point p1. The circuits Z1 and Z3 are connected to a junction point p2. The circuits Z2 and Z4 are connected to a junction point p3. The circuits Z3 and Z4 are connected to a junction point p4. The potential of the junction point 4 is used as a reference potential.

The voltage-dividing impedance circuit 120 is defined by a series circuit of impedances z5 and z6. One end and the other end of the voltage-dividing impedance circuit 120 are connected to the junction points p2 and p3, respectively.

The feedback-signal processing circuit 130 includes an amplifying circuit and a phase-shift circuit. The feedback-signal processing circuit 130 feeds back a signal obtained at a voltage-dividing point p5 of the voltage-dividing impedance circuit 120 to the junction point p1.

The bridge circuit 110, the voltage-dividing impedance circuit 120, and the feedback-signal processing circuit 130 define an oscillating circuit. Specifically, the bridge circuit 110 operates as the resonant circuit system of the oscillating circuit, and the feedback-signal processing circuit 130 maintains an oscillating state by positively feeding back a resonant signal to the resonant circuit system. In other words, the amplification factor of the amplifying circuit and the amount of phase shifting in the feedback-signal processing circuit 130 are determined such that oscillating conditions are satisfied.

The piezoelectric vibrators s1 and s2 are provided such that acceleration generates a compressive stress on one of the piezoelectric vibrators and a tensile stress on the other one. Also, when no acceleration is applied, the resonant characteristics of the piezoelectric vibrators s1 and s2 are adjusted to be approximately identical. The specific structure of the piezoelectric vibrators s1 and s2 is described later.

The phase-difference-signal processing circuit 140 includes a phase adjusting circuit, first and second phase-difference detecting circuits, and a differential amplification circuit. The phase adjusting circuit performs phase adjustment on the signal at the voltage dividing point p5 of the voltage-dividing impedance circuit 120. The first phase-difference detecting circuit uses an output signal from the phase adjusting circuit as a reference signal, and converts a phase difference between the reference signal and a signal obtained at the junction point p2 of the bridge circuit 110 into a voltage signal. The second phase-difference detecting circuit converts a phase difference between the reference signal and a signal obtained at the junction point p3 of the bridge circuit 110 into a voltage signal. The differential amplification circuit performs differential amplification on output voltages from the first and second phase-difference detecting circuits.

Figure 2:
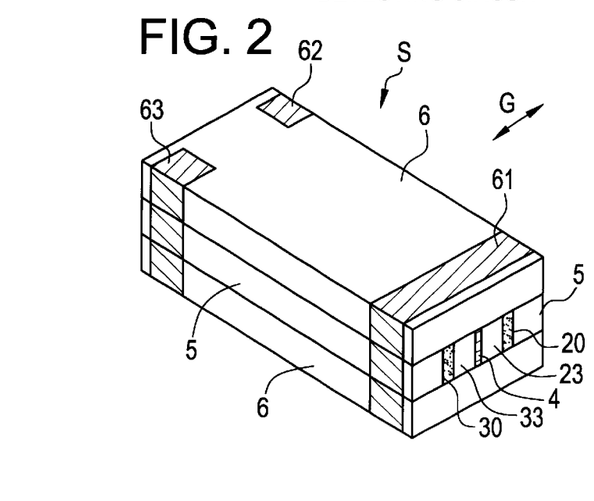
FIG. 2 is a perspective view showing the exterior of a piezoelectric vibrator.
Figure 3:
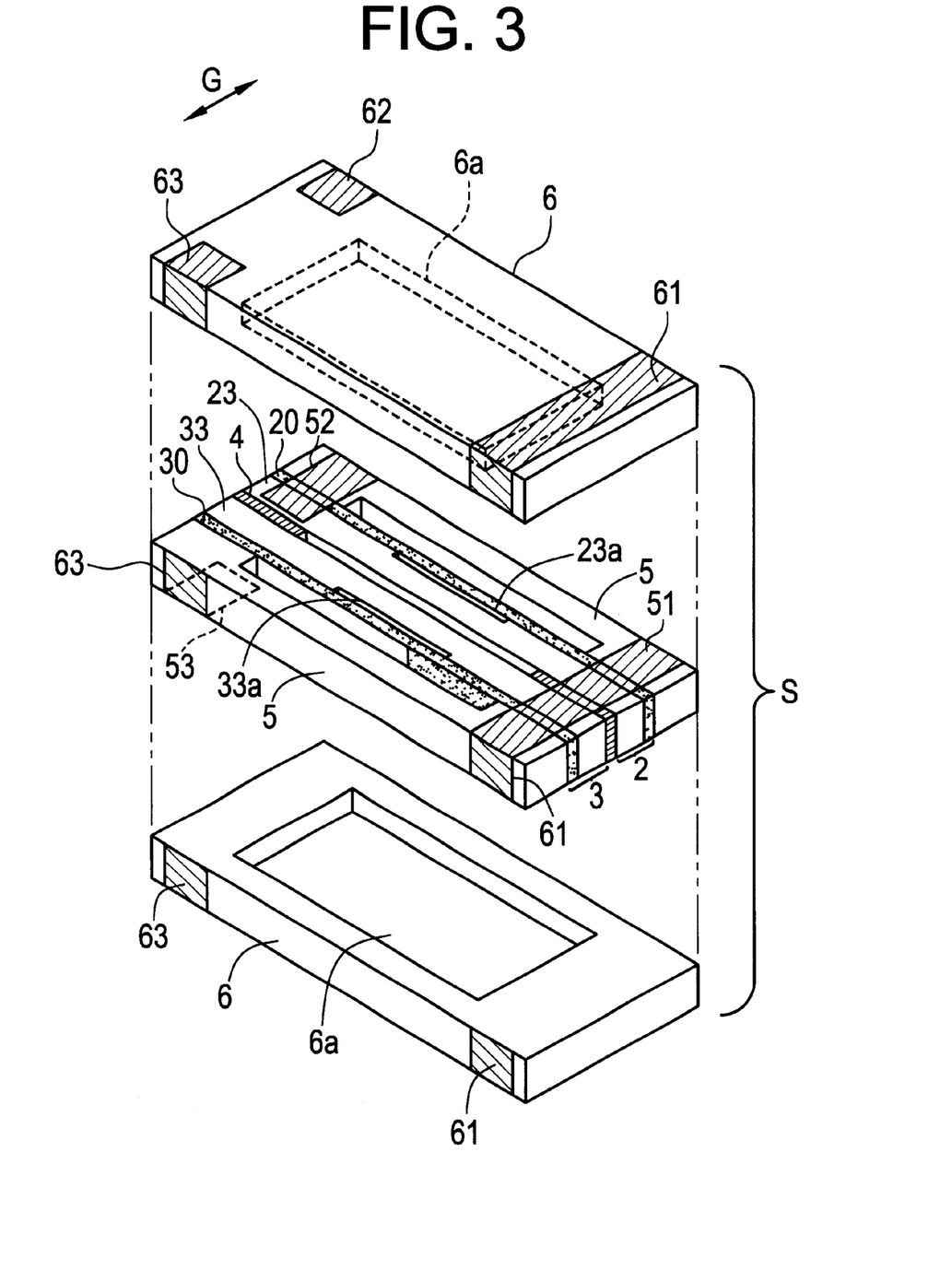
FIG. 3 is an exploded perspective view showing the piezoelectric vibrator shown in FIG. 2.
Figure 4:
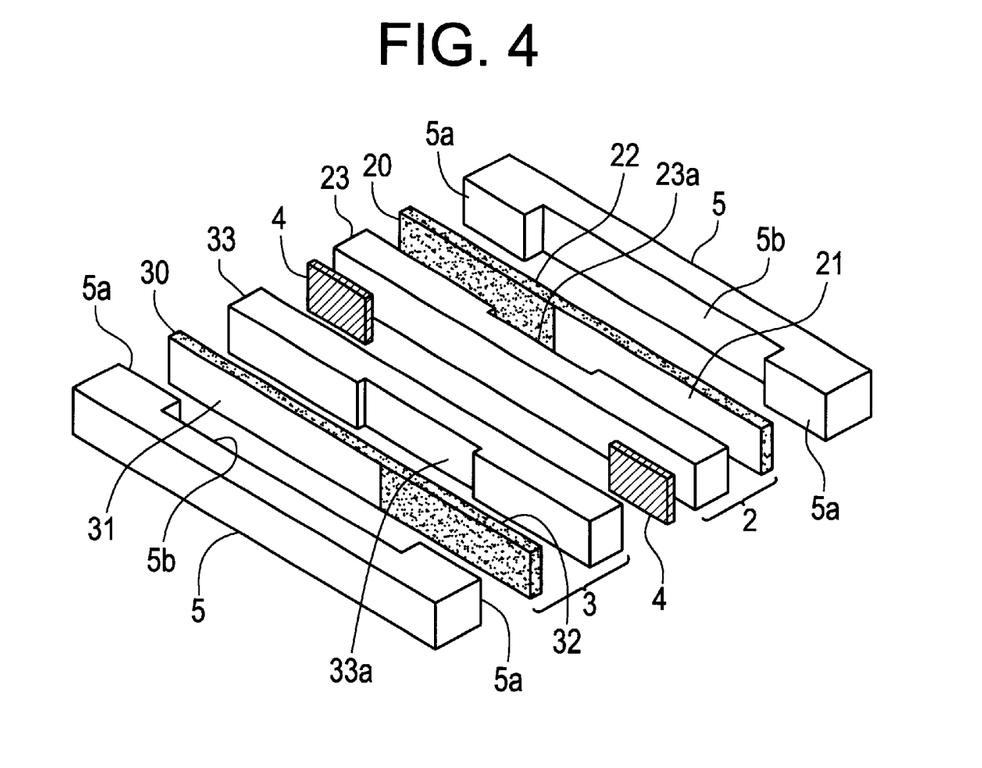
FIG. 4 is an exploded perspective view showing the main portion of the piezoelectric vibrator shown in FIG. 2.

Next, the structure of the piezoelectric vibrators s1 and s2 is described below with reference to FIGS. 2 to 4. FIG. 2 is a perspective view of the entire piezoelectric vibrator structure. FIG. 3 is a perspective, exploded view of the piezoelectric vibrator structure shown in FIG. 2. FIG. 4 is a perspective, exploded view of the main portion of the piezoelectric vibrator structure shown in FIG. 3.

A piezoelectric vibrator s is defined by integrating the piezoelectric vibrators s1 and s2. In the piezoelectric vibrator s, two acceleration detecting elements 2 and 3 are accommodated in insulating casings 5 and 6 made of insulating ceramic via a double cantilever structure. In the first preferred embodiment, the acceleration detecting elements 2 and 3 are preferably unimorph detecting elements. An integrated structure is provided such that a resonator 20 which includes electrodes 21 and 22 provided on the surfaces of a piezoelectric ceramic strip and a resonator 30 which includes electrodes 31 and 32 provided on the surfaces of the other piezoelectric ceramic strip are respectively bonded to surfaces of base plates 23 and 33 by bonding or soldering. Both the resonators 20 and 30 are energy-trap thickness-shear-vibration-mode resonators, and each resonator is polarized in its thickness direction. Ends of the electrodes 21 and 22 are opposed to each other in the central portion of the resonator 20, and ends of the electrodes 31 and 33 are opposed to each other in the central portion of the resonator 30. The other ends of the electrodes 21 and 22 lead to opposed ends of the resonator 20, and the other ends of the electrodes 31 and 32 lead to opposed ends of the resonator 30.

The base plates 23 and 33 are insulating plates which are preferably substantially identical in length and width to the resonators 20 and 30. Bending neutral planes caused by the operation of acceleration on the unimorph acceleration detecting elements 2 and 3 are preferably closer to the base plates 23 and 33 than to planes on which the resonators 20 and 30 are respectively bonded to the base plates 23 and 33. The base plates 23 and 33 are preferably made of a material having bending rigidity higher than that of the resonators 20 and 30. To enable the base plates 23 and 33 to function as bodies (weight) having mass, each of the base plates 23 and 33 preferably has a relatively large mass. A depression 23a defining a gap which is greater than the trapped vibration of the resonator 20 and which is less than a bending range caused by acceleration is provided on a surface of the base plate 23 which opposes the resonator 20. A depression 33a defining a gap which is greater than the trapped vibration of the resonator 30 and which is less than a bending range caused by acceleration is provided on a surface of the base plate 33 which opposes the resonator 20. The depressions 23a and 33a prevent the trapped vibrations of the resonators 20 and 30 from being damped, and the acceleration causes the resonators 20 and 30 and the base plates 23 and 33 to bend as a whole.

The base plates 23 and 33 are bonded to each other at their ends in the longitudinal direction by bonding layers 4 provided as spacers such that the resonators 20 and 30 are independently bent when acceleration G is applied. The outer surfaces of the acceleration detecting elements 2 and 3 in the directions of the application of acceleration G are covered with a pair of right and left casing members 5. The casing members 5 preferably have substantially U-shaped sections. One of them is bonded to the external surfaces (exposed surfaces of the resonator 20) of ends of the acceleration detecting element 2, and the other is bonded to the external surfaces (exposed surfaces of the resonator 30) of ends of the acceleration detecting element 3. Accordingly, spaces in which the acceleration detecting elements 2 and 3 bend in accordance with acceleration G are provided between the casing members 5 and the acceleration detecting elements 2 and 3 by depressions 5b of the casing members 5.

Upper and lower open surfaces provided by the casing members 5 and the acceleration detecting elements 2 and 3 are covered with a pair of upper and lower covering members 6. The internal surfaces of the covering members 6 include depressions arranged to prevent the covering members 6 from touching the acceleration detecting elements 2 and 3. The peripheries of the covering members 6 are bonded to the portions of the casing members 5 and the acceleration detecting elements 2 and 3. Accordingly, the bending portions that are displaced are completely shielded by the casing members 5 and the covering members 6.

A specific acceleration-sensor circuit and its operation are described below with reference to FIGS. 5, 6A and 6B, 7A and 7B, and FIG. 8.

Figure 5:
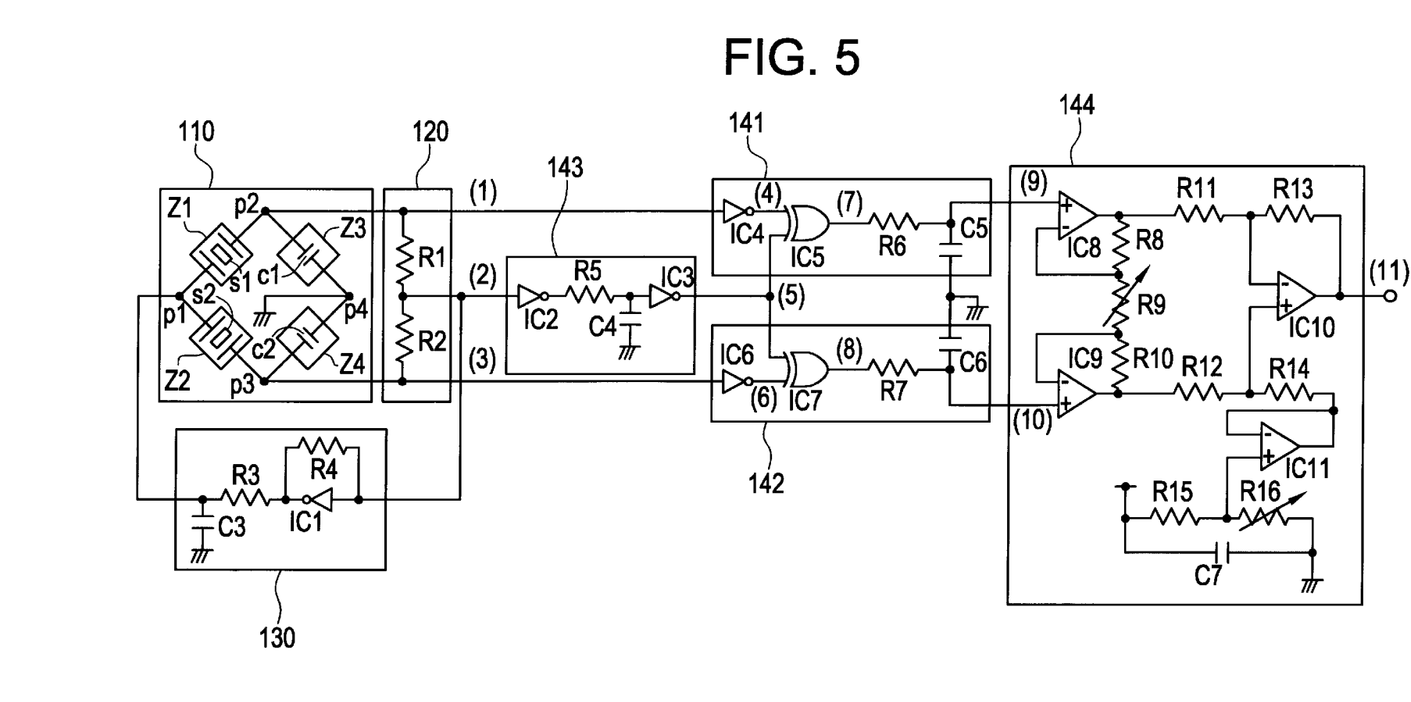
FIG. 5 is a circuit diagram showing a modification of the acceleration sensor shown in FIG. 1.

FIG. 5 is a circuit diagram of an acceleration sensor. In this example, a voltage-dividing impedance circuit 120 is defined by a series circuit of resistors R1 and R2, and a feedback-signal processing circuit 130 is defined by an inverter IC1, resistors R3 and R4, and a capacitor C3. In the voltage-dividing impedance circuit 120, the resistor R4 is a feedback resistor for determining an operating point of the inverter IC1. The inverter IC1 and the feedback resistor R4 define an amplifying circuit. The capacitor C3 and the resistor R3 define a phase-shift circuit. The phase-shift circuit adjusts the phase of a feedback signal to a resonant circuit defined by a bridge circuit 110. In other words, the phase-shift circuit finely adjusts an oscillating frequency.

Although the phase-shift circuit is provided on the output side of the inverter IC1 in this example, it may be provided on the input side. If stable oscillation is maintained without fine adjustment of the phase, the phase-shift circuit may be omitted.

In the feedback-signal processing circuit 130, the amount of phase shifting is preferably about −200 degrees, and the oscillation frequency is preferably about 8 MHz.

When, acceleration G is applied in one direction to piezoelectric resonators s1 and s2, stresses are generated in the piezoelectric resonators s1 and s2 while having mutually reverse or inverted phases. Thus, the resonators s1 and s2 output signals having reverse or inverted phases to each other. In other words, one of the signals has a reverse or inverted phase as compared to the phase of the other signals. Thus, the application of the acceleration breaks the balance of the bridge circuit 110, such that a difference occurs between a voltage (1) at the junction point of the piezoelectric vibrator s1 and the capacitor C1 and a voltage (3) at the junction point of the piezoelectric vibrator s2 and the capacitor C2.

By performing an experiment, it has been confirmed that the difference between the phases of the voltages (1) and (3) is substantially proportional to the magnitude of the acceleration. In other words, the phase difference between the voltages (1) and (3) represents the magnitude of the acceleration.

A first phase-difference detecting circuit 141 includes an exclusive OR gate IC5, an inverter IC4, a resistor R6, and a capacitor C5. The exclusive OR gate IC5 and the inverter IC4 generate a signal having a duty that is changed in accordance with the phase difference of an input signal, and the signal is smoothed by the resistor R6 and the capacitor C5, as described later. In this manner, a voltage signal corresponding to the phase difference of the input signal is output.

Additionally, a second phase-difference detecting circuit 142 is provided that is similar to the first phase-difference detecting circuit 141. The second phase-difference detecting circuit 142 includes an exclusive OR gate IC7, an inverter IC6, a resistor R7, and a capacitor C6, and outputs a voltage signal corresponding to the phase difference of an input signal.

A phase adjusting circuit 134 includes inverters IC2 and IC3, a resistor R5, and a capacitor C4. The time constants of the resistor R5 and the capacitor C4 determine the amount of phase shifting. The amount of phase shifting is used to shift the phase of a reference signal such that the first and second phase-difference detecting circuits 141 and 142 operate in a stable manner. When the acceleration G is not applied, the phase difference between voltages (4) and (5), and the phase difference between voltages (6) and (5), are preferably about 90 degrees.

A differential amplification circuit 144 includes amplifiers IC8, IC9, IC10, and IC11, and a plurality of resistors for determining operating points and gains thereof. The differential amplification circuit 144 outputs an output voltage (11) by performing differential amplification on an output voltage (9) from the first phase-difference detecting circuit 141 and an output voltage (10) from the second phase-difference detecting circuit 142. At this time, the amplifier IC11 offsets a reference voltage of the amplifier IC10 by an output voltage of the amplifier IC11. In other words, by adjusting a resistor R16, the amount of the offset is determined and the balance of the differential amplification circuit 144 is correctly established, wherein a voltage signal in proportional to the acceleration is output.

Figure 6A:
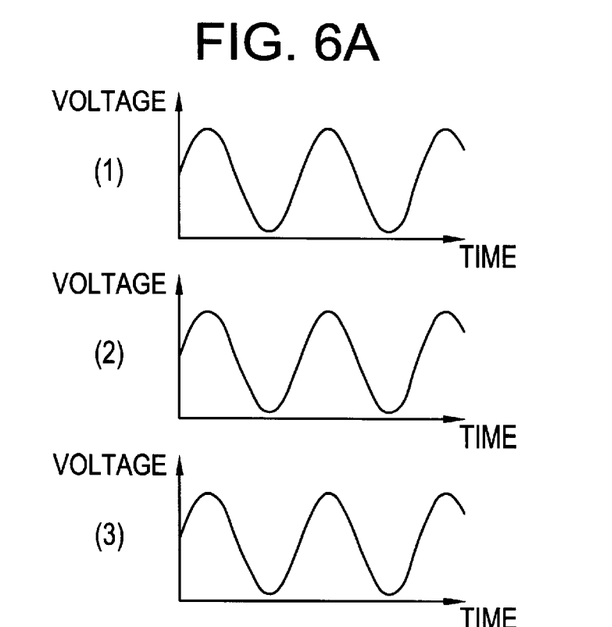
FIG. 6A illustrates waveform charts showing voltages (1) to (3) in the acceleration sensor shown in FIG. 1 which are obtained when acceleration is not applied.
Figure 6B:
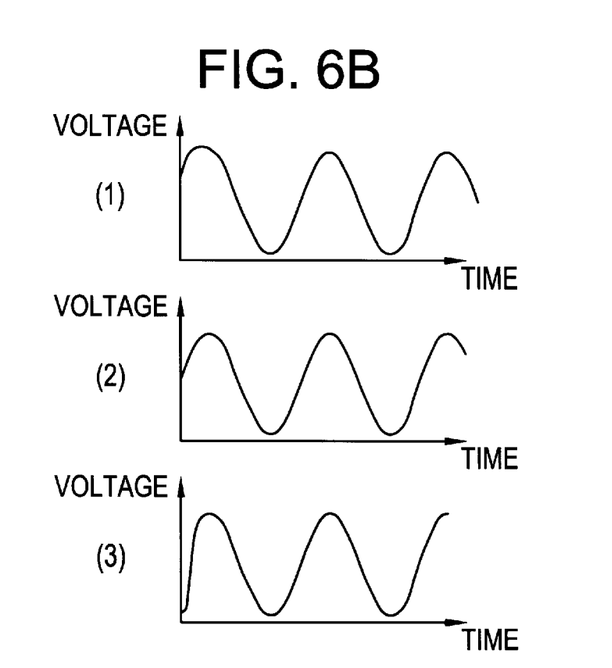
FIG. 6B illustrates waveform charts showing voltages (1) to (3) in the acceleration sensor shown in FIG. 1 which are obtained when acceleration is applied.

FIGS. 6A and 6B show the waveforms of the voltages (1) to (3). FIG. 6A shows the waveforms of the voltages (1) to (3) that are obtained when acceleration is not applied. The voltage signals (1) to (3) have identical waveforms (identical phases) because the piezoelectric vibrators s1 and s2 have identical characteristics when the acceleration is not applied. FIG. 6B show the waveforms of the voltages (1) to (3) that are obtained when the acceleration is applied. When the acceleration is applied, phases are reversely changed such that the phase of the voltage signal (1) leads that of the voltage signal (2) as a reference signal and that the phase of the voltage signal (3) lags behind that of the voltage signal (2).

When the voltage signal (1) is represented by a function Ya(t), the voltage signal (2) is represented by a function R(t), and the voltage signal (3) is represented by a function Yb(t), the following relationships hold:

$$Ya(t) = A \times \cos(\omega t + \theta(t)) \quad (1)$$

$$Yb(t) = A \times \cos(\omega t - \theta(t)) \quad (2)$$

$$R(t) = \{Ya(t) + Yb(t)\}/2 \quad (3)$$
$$= A \times \cos\omega t \times \cos\theta(t)$$

where A represents an amplitude, ω represents an oscillating angular frequency, t represents a time, and θ (t) represents a time function of phase change generated by acceleration.

The expressions (1) and (2) indicate that the voltage signals (1) and (3) are phase-modulated by the acceleration. The expression (3) indicates that, because the voltage signal (2) is amplitude-modulated by the acceleration, no phase change occurs.

Figures 7A, 7B:
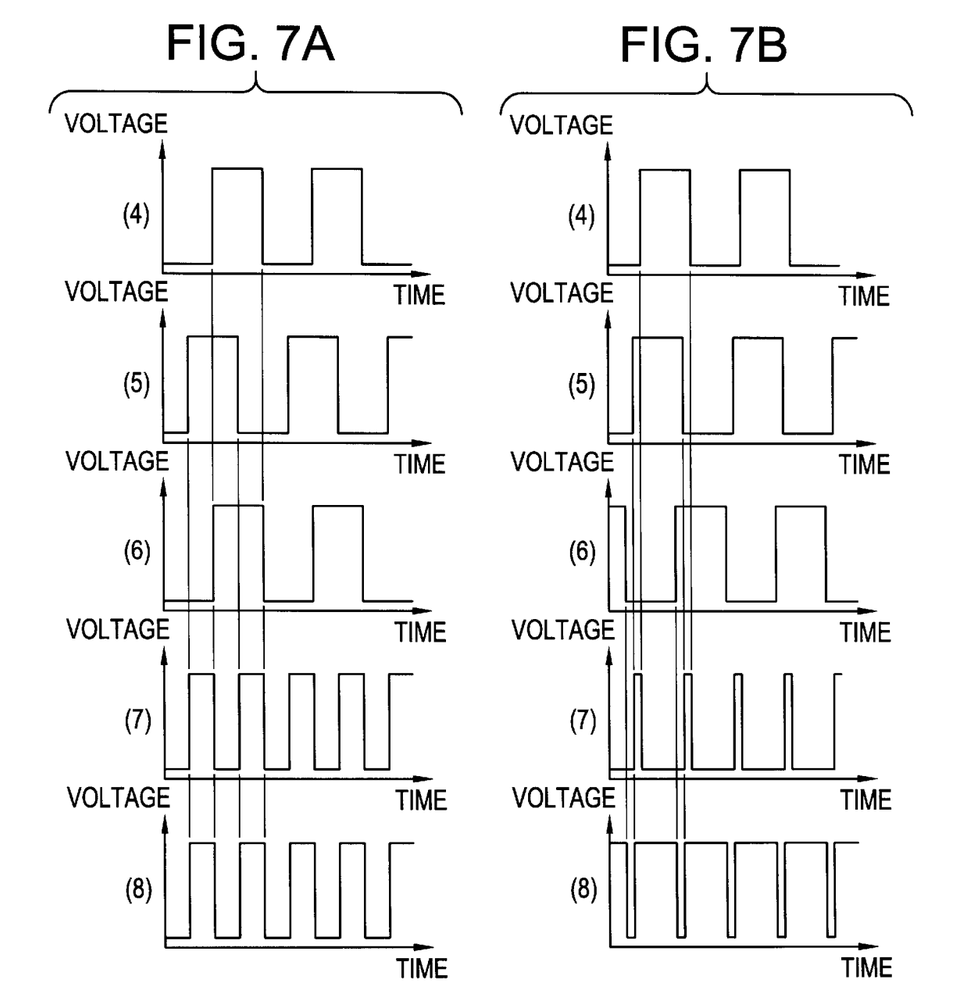
FIG. 7A illustrates waveform charts showing voltages (4) to (8) in the acceleration sensor shown in FIG. 1 which are obtained when the acceleration is not applied.
FIG. 7B illustrates waveform charts showing voltages (4) to (8) in the acceleration sensor shown in FIG. 1 which are obtained when the acceleration is applied.

FIG. 7A shows the waveforms of the voltages (4) to (8) which are obtained when the acceleration is not applied. FIG. 7B shows the waveforms of the voltages (4) to (8) which are obtained when the acceleration is applied. The voltage signal (4) is obtained such that the waveform of the voltage signal (1) shown in FIG. 5 is shaped by the inverter IC4 of the first phase-difference detecting circuit 141. Similarly, the voltage signal (6) is obtained such that the waveform of the voltage signal (3) shown in FIG. 5 is shaped by the inverter IC6 of the second phase-difference detecting circuit 142. The voltage signal (5) is obtained by performing phase adjustment on the voltage signal (2).

A phase comparing circuit using an exclusive OR gate must shift the phase of a comparative waveform by about 90 degrees. Thus, the phase adjusting circuit 143 adjusts the phase of the voltage signal (2) such that the phase difference is about 90 degrees when the acceleration is not applied, as shown in FIG. 7A. A voltage signal (7) is an output from the exclusive OR gate IC5 of the first phase-difference detecting circuit 141, and a voltage signal (8) is an output from the exclusive OR gate IC7 of the second phase-difference detecting circuit 142.

When the acceleration is applied, the phases of the voltage signals (4) and (6) reversely change such that the phase of the voltage signal (4) leads and the phase of the voltage signal (6) lags with respect to that of the voltage signal (5). The waveforms of the voltage signals (7) and (8) indicate that the outputs of the exclusive OR gates have pulse-width-modulation (PWM) waveforms in which output waveform duty is changed by acceleration.

One of the PWM waveforms is smoothed by a smoothing circuit in the first phase-difference detecting circuit 141 which includes the resistor R6 and the capacitor C5, and the other PWM waveform is smoothed by a smoothing circuit in the second phase-difference detecting circuit 142 which includes the resistor R7 and the capacitor C6.

Figure 8:
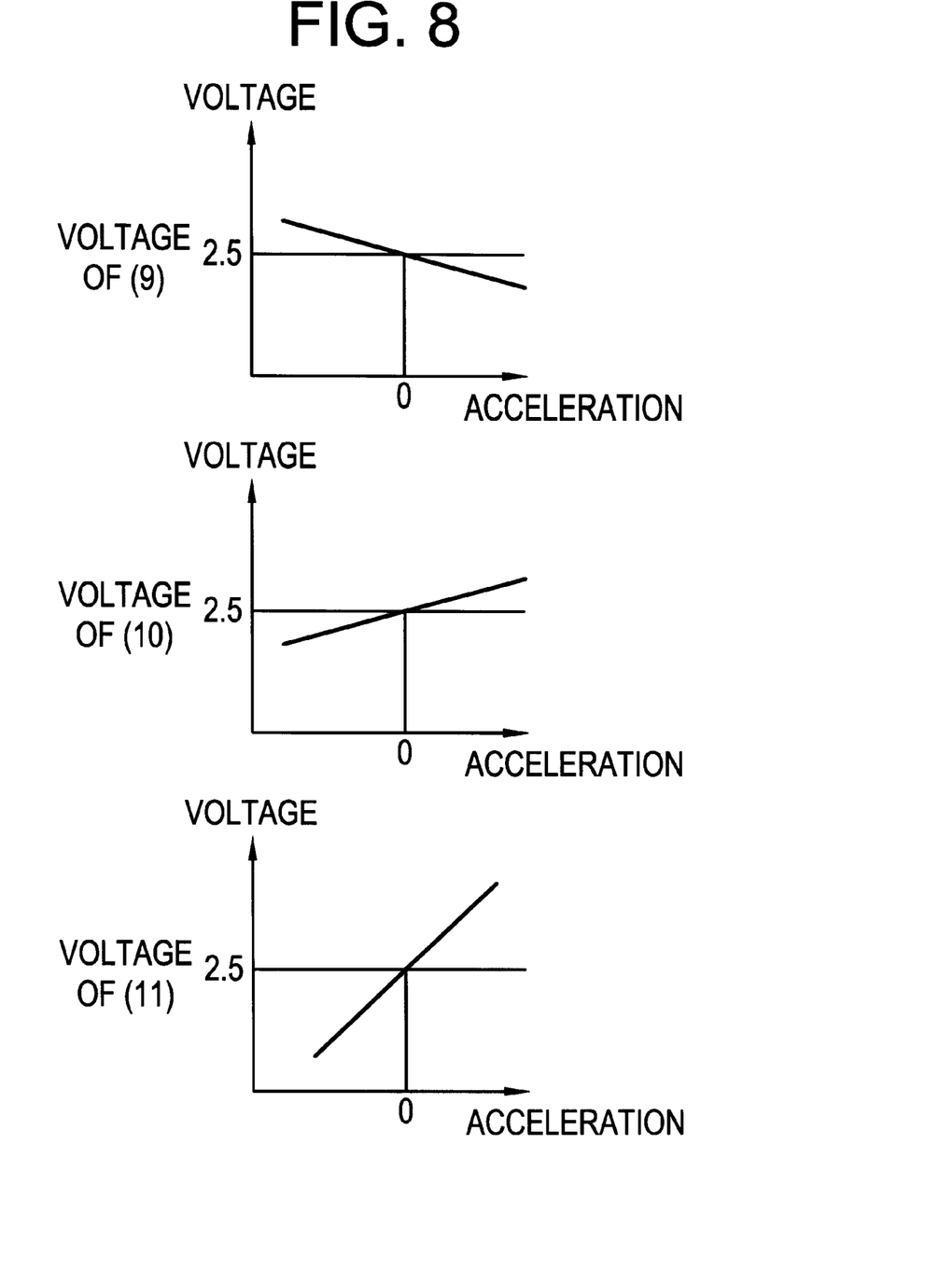
FIG. 8 illustrates graphs showing relationships between acceleration and the outputs of a phase-difference detecting circuit and a differential amplification circuit in the acceleration sensor shown in FIG. 1.

FIG. 8 shows changes in the above voltage signals (9) to (11). In FIG. 8, the horizontal axis represents acceleration, and the vertical axis represents voltage.

Assuming the voltage signal (9) is a function Vp1, the voltage signal (10) is a function Vp2, and the voltage signal (11) is a function Vd, the following expressions hold:

$$Vp1 = Vcc \times (\phi/\pi - \theta \times \alpha/\pi) \quad (4)$$

$$Vp2 = Vcc \times (\phi/\pi + \theta \times \alpha/\pi) \quad (5)$$

$$Vd = Vcc \times \beta \times (Vp2 - Vp1) + \gamma \quad (6)$$
$$= \beta \times Vcc \times (2 \times \theta \times \alpha/\pi) + \gamma$$

However, $$0 < \phi < \pi \quad (7)$$

$$0 \leq Vp1 \leq Vcc \quad (8)$$

$$0 \leq Vp2 \leq Vcc \quad (9)$$

where φ represents the amount of phase shifting by the phase adjusting circuit, ϕ represents a phase-change coefficient per 1G of acceleration, α represents acceleration, Vcc represents a power-supply voltage, β represents the gain of the differential amplification circuit, and γ represents a reference voltage (= the output voltage of the exclusive OR gate IC11) of the differential amplification circuit.

As described above, the amount of phase shifting by the phase adjusting circuit is preferably about 90 degrees (π/2 radians) such that the expressions (7) to (9) are maintained.

Also, the first preferred embodiment preferably uses the settings, β=100, Vcc=5 (volts), and γ=Vcc/2.

Although the first preferred embodiment uses only piezo-electric vibrators and capacitors for the bridge circuit 110, the elements of the bridge circuit 110 are not limited to the vibrators and capacitors described with respect to the first preferred embodiment. The impedance circuits Z1 and Z2 shown in FIG. 1 may include a capacitor, a resistor, an inductor, or an active element. Similarly, the impedance circuits Z3 and Z4 may include a resistor, an inductor, or an active element. When no acceleration is applied, if the constants are set such that the relationship among the impedance circuits Z1 to Z4 are as follows:

$$z1 \times z4 = z2 \times z3 \quad (10)$$

the bridge circuit operates in a similar manner to the above case.

Figure 9:
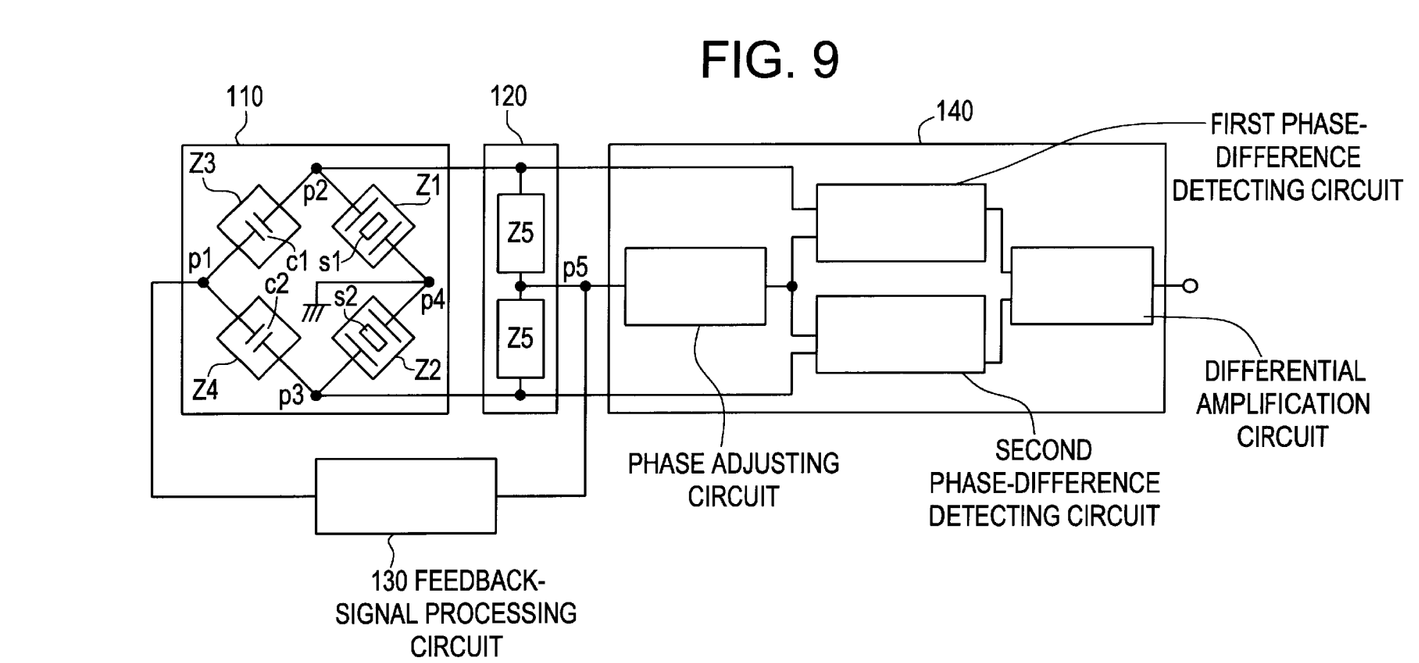
FIG. 9 is a block diagram showing an entire acceleration sensor according to a second preferred embodiment of the present invention.

An acceleration sensor according to a second preferred embodiment of the present invention is described below with reference to FIGS. 9 and 10. The acceleration sensor shown in FIG. 9 differs from that shown in FIG. 1 in the structure of a bridge circuit 110. Specifically, the bridge circuit 110 in FIG. 9 includes an impedance circuit Z1 including a piezoelectric vibrator s1, an impedance circuit Z2 including a piezoelectric vibrator s2, a load impedance circuit Z3 including a capacitor C1, and a load impedance circuit Z4 including a capacitor C2. The impedance circuit Z1 and the load impedance circuit Z2 are connected to a junction point p4. The impedance circuit Z1 and the load impedance circuit Z3 are connected to a junction point p2. The impedance circuit Z2 and the load impedance circuit Z4 are connected to a junction point p3. The load impedance circuits Z3 and Z4 are connected to a junction point p1. A potential at the junction point p4 is used as a reference potential. The other portions are identical to those in the first preferred embodiment.

Even when a bridge circuit in which the potential of a junction point of piezoelectric vibrators is used as a reference potential, as described above, an acceleration sensor including the bridge circuit operates in a similar manner as the first preferred embodiment, and similar advantages are achieved. However, to ensure that the oscillating circuit, defined by bridge circuit 110, a voltage-dividing impedance circuit 120, and a feedback-signal processing circuit 130, oscillates in a stable manner, the feedback-signal processing circuit 130 is configured as shown in FIG. 10.

Figure 10:
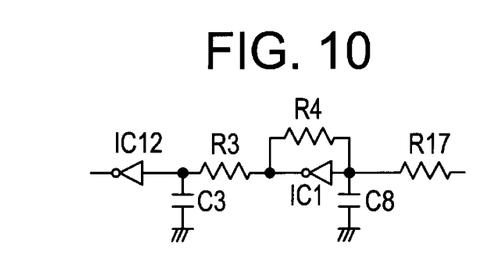
FIG. 10 is a circuit diagram a feedback-signal processing circuit in the acceleration sensor shown in FIG. 9.

In FIG. 10, the portion including an exclusive OR gate IC1, resistors R3 and R4, and a capacitor C3 is preferably the same as that shown in FIG. 5. In FIG. 10, a resistor R17 and a capacitor C8 preferably define a phase-shift circuit. The entire phase-shift circuit shifts a phase by −340 degrees (=+20 degrees). In the example shown in FIG. 10, an inverter IC12 is provided as a buffer in the output portion of the feedback-signal processing circuit 130. This buffer provides an accurate amount of phase shifting without further modification of the bridge circuit 110.

An acceleration sensor according to a third preferred embodiment of the present invention is described below with reference to FIG. 11. In the acceleration sensor shown in FIG. 11, an output signal from a feedback-signal processing circuit 130 is supplied as an input to a phase adjusting circuit 143. In this configuration, voltage signals having reverse phases in accordance with a change in acceleration can also be output from first and second phase-detection circuits 141 and 142.

An acceleration sensor according to a fourth preferred embodiment of the present invention is described below with reference to FIGS. 12 and 13.

Figure 12:
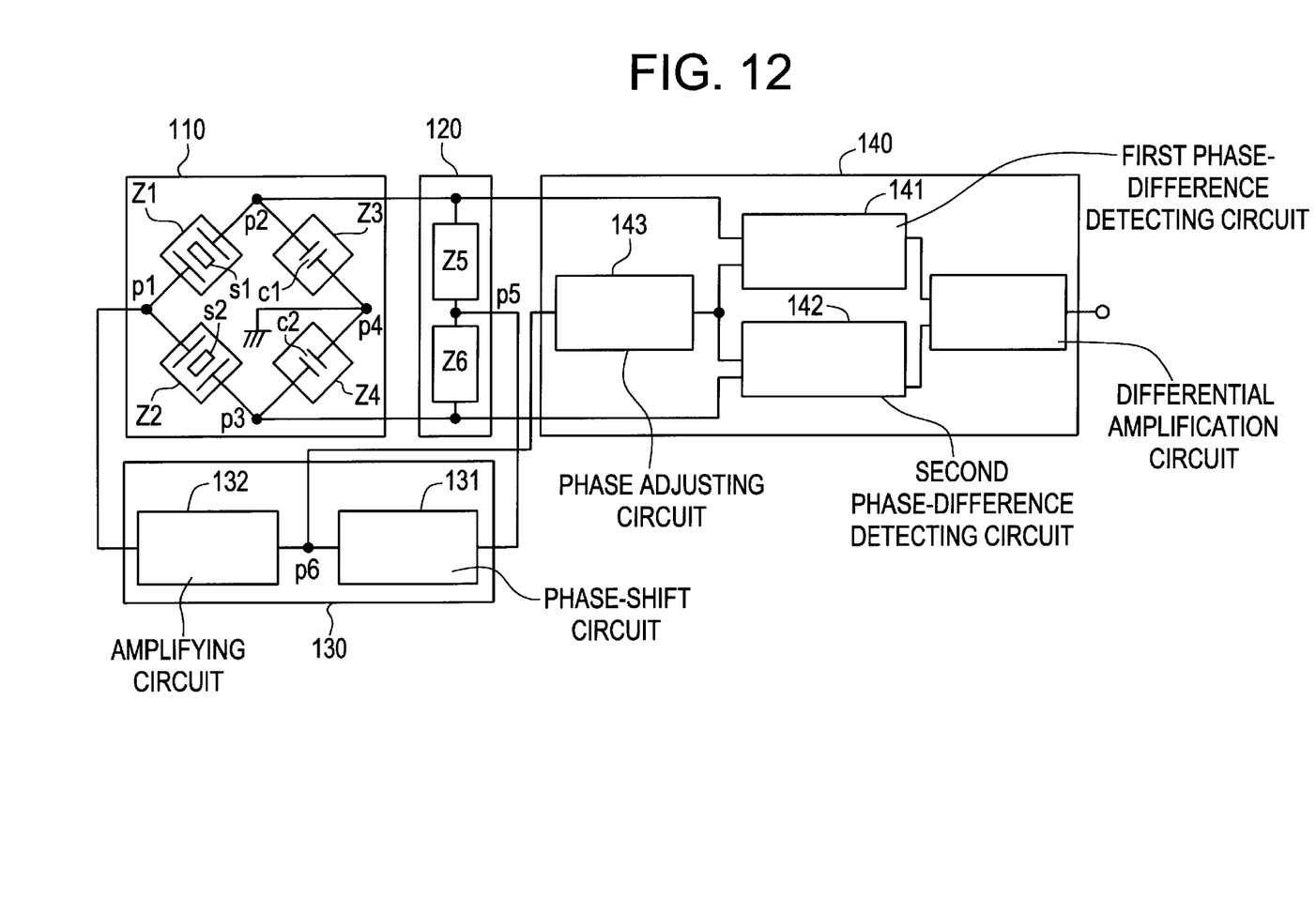
FIG. 12 is a block diagram showing an entire acceleration sensor according to a fourth preferred embodiment of the present invention.

In the acceleration sensor shown in FIG. 12, an output signal from a phase-shift circuit 131 in a feedback-signal processing circuit 130 is supplied as an input to a phase adjusting circuit 143. In this configuration, voltage signals having reverse phases in accordance with a change in acceleration can also be output from first and second phase-detection circuits 141 and 142.

Figure 13:
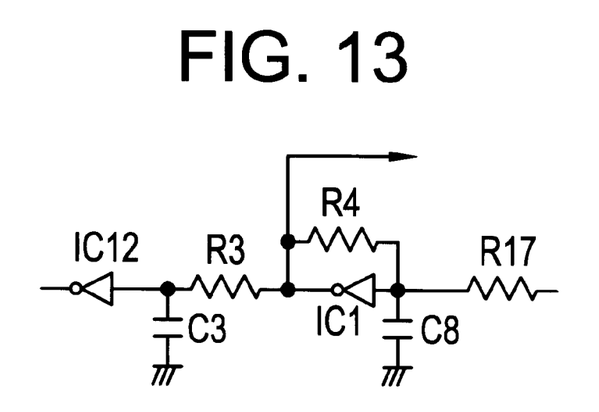
FIG. 13 is a circuit diagram a feedback-signal processing circuit in the acceleration sensor shown in FIG. 12.

FIG. 13 shows an example of a feedback-signal processing circuit 130. This feedback-signal processing circuit 130 is similar to that described in FIG. 10 and is designed such that a predetermined phase-shift signal is led from a point of the circuit 130 and is supplied to the phase adjusting circuit 143. Therefore, when the amount of phase shifting by the feedback-signal processing circuit 130 is appropriately set, the phase adjusting circuit 143 may be omitted. For example, when the phase adjusting circuit 143 must shift the phase by about −90 degrees, a signal which shifts by approximately −90 degrees or approximately −270 degrees (=+90 degrees) may be led outward from a point of the feedback-signal processing circuit 130. In other words, in this case, by omitting the phase adjusting circuit 143, the signal led from the point of the feedback-signal processing circuit 130 is directly supplied as a first or second reference signal.

Figure 14:
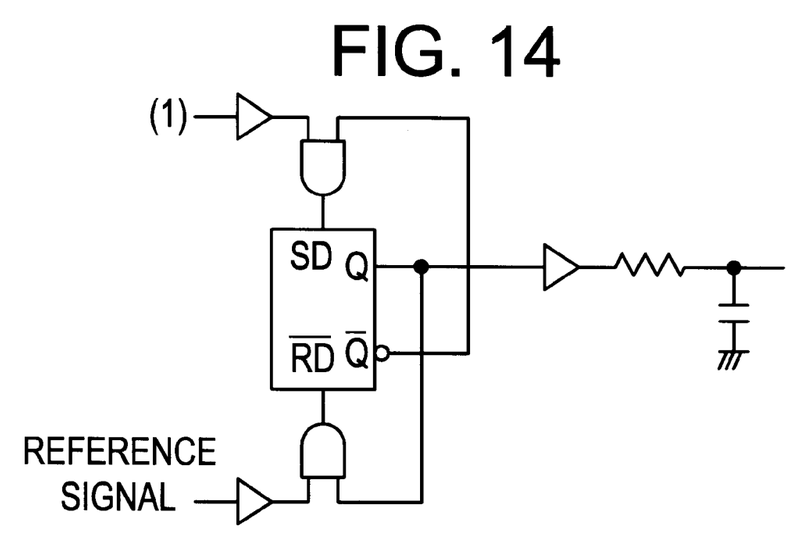
FIG. 14 is a circuit diagram showing the structure of a phase-difference detecting circuit in an acceleration sensor according to a fifth preferred embodiment of the present invention.
Figure 15A:
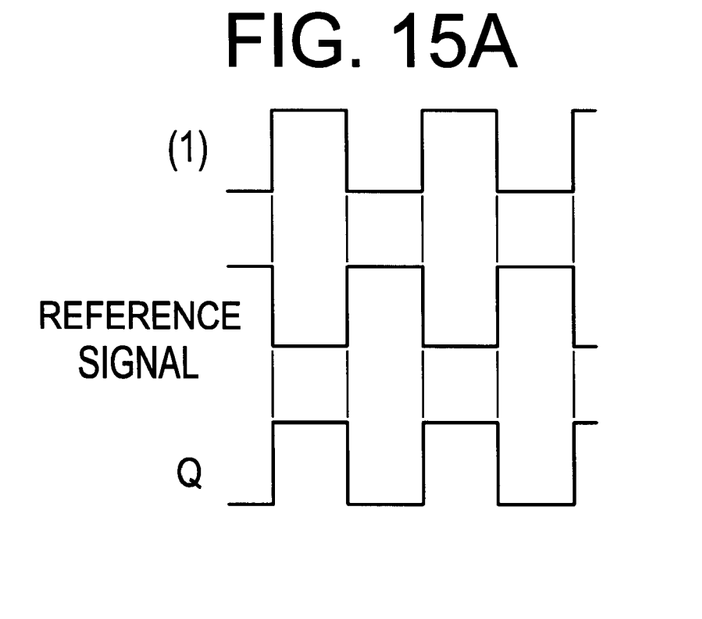
FIGS. 15A and 15B are waveform charts showing signals in the phase-difference detecting circuit shown in FIG. 14.
Figure 15B:
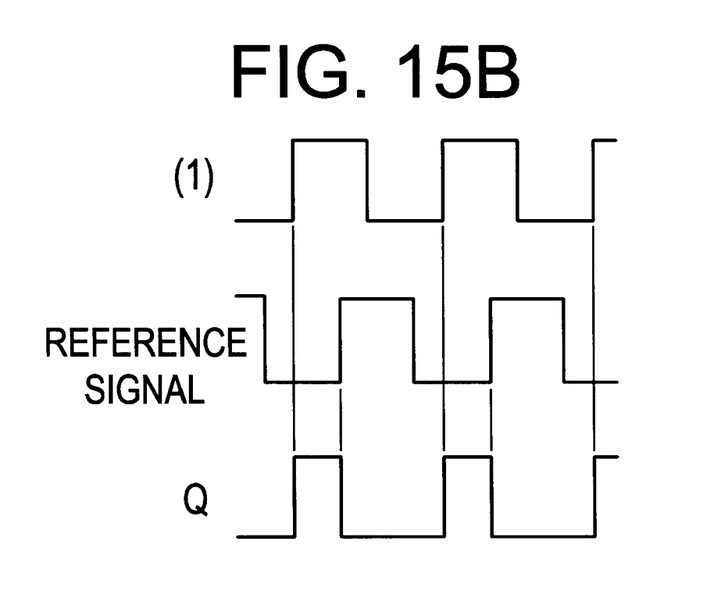

An acceleration sensor according to a fifth preferred embodiment of the present invention is described FIGS. 14 and 15A and 15B.

FIG. 14 is a circuit diagram of a phase-difference detecting circuit different from that shown in FIG. 5. In this phase-difference detecting circuit, an R-S flip-flop is utilized. For example, in a case in which the circuit in FIG. 14 is applied to the first and second phase-difference detecting circuits 141 and 142 shown in FIG. 11, the phase of a reference signal is preset such that, when no acceleration is applied, the phase of the reference signal shifts by about −180 degrees or about −540 degrees (=+180 degrees) with respect to that of a comparative signal.

FIGS. 15A and 15B show a case in which the circuit shown in FIG. 14 is applied to the first phase-difference detecting circuits 141. The waveform (1) indicates an input signal, and the waveform Q indicates the Q output of the R-S flip-flop. FIG. 15A shows waveforms obtained when the acceleration is not applied, and FIG. 15B shows waveforms obtained when the acceleration is applied. As is clear from FIGS. 15A and 15B, the duty of the Q output changes in accordance with the phase difference of the input signal to the reference signal. As shown in FIG. 14, by using a resistor and a capacitor to smooth the Q output, a voltage signal in accordance with the duty, that is, the acceleration, is output.

Figure 11:
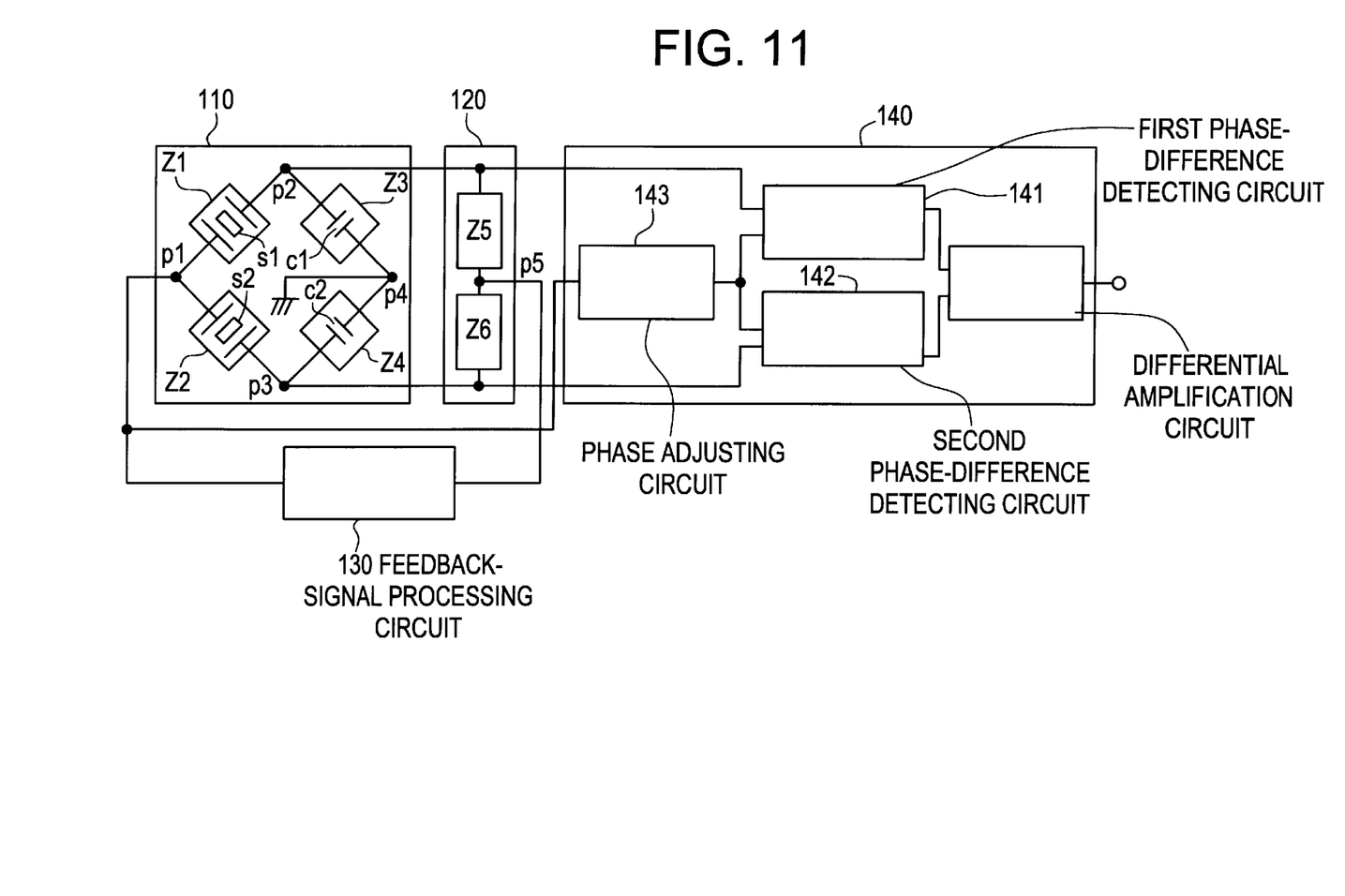
FIG. 11 is a block diagram showing an entire acceleration sensor according to a third preferred embodiment of the present invention.

When the amount of phase shifting in the feedback-signal processing circuit 130 shown in FIG. 11 is about −200 degrees, this amount is close to an ideal phase-shift amount of about −180 degrees of the above reference signal. Thus, by providing the circuit shown in FIG. 14 in the first and second phase-difference detecting circuits 141 and 142, the phase adjusting circuit 143 can be omitted.

Since the oscillating circuits shown in the above-described preferred embodiments include piezoelectric vibrators and use differential connections, their frequency and phase characteristics are very stable. Accordingly, an output which is led out from each oscillating circuit may be used as a clock signal to another logic circuit. Thus, a separate clock signal generating circuit can be omitted.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. An acceleration sensor comprising:
   first and second piezoelectric vibrators in which reverse stresses are generated by acceleration;
   a bridge circuit that includes a first impedance circuit including the first piezoelectric vibrator, a second impedance circuit including the second piezoelectric vibrator, a first load impedance circuit including a first capacitor, and a second load impedance circuit including a second capacitor, said first impedance circuit and said second impedance circuit are connected to a first junction point, said first impedance circuit and said first load impedance circuit are connected to a second junction point, said second impedance circuit and said second load impedance circuit are connected to a third junction point, and said first load impedance circuit and said second load impedance circuit are connected to a fourth junction point having a potential which defines a reference potential;
   a voltage-dividing impedance circuit provided between said second junction point and said third junction point;
   a feedback-signal processing circuit for feeding back the signal of a voltage-dividing point of said voltage-dividing impedance circuit to said first junction point; wherein
   an oscillating circuit is arranged; and
   a phase-difference-signal processing circuit which detects an oscillation-output-phase difference between said second junction point and said third junction point and which outputs an acceleration-detection signal.

2. An acceleration sensor according to claim 1, wherein said feedback-signal processing circuit comprises:
   an amplifier for amplifying the signal of the voltage-dividing point; and
   a phase-shift circuit for shifting the phase of the feedback signal.

3. An acceleration sensor according to claim 1, wherein said voltage-dividing impedance circuit is a voltage-dividing circuit including a plurality of resistors connected in series.

4. An acceleration sensor according to claim 1, wherein said phase-difference-signal processing circuit comprises:
   a first phase-difference detecting circuit which detects a phase difference between a reference signal and the signal of said second junction point while using the signal of the voltage-dividing point as said reference signal;
   a second phase-difference detecting circuit which detects a phase difference between said reference signal and the signal of said third junction point; and
   a differential amplification circuit for performing differential amplification on the outputs of the first and second phase-difference detecting circuits.

5. An acceleration sensor according to claim 4, further comprising a phase adjusting circuit for adjusting the phase of said reference signal which is input to the first and second phase-difference detecting circuits.

6. An acceleration sensor according to claim 1, wherein said phase-difference-signal processing circuit comprises:
- a first phase-difference detecting circuit which detects a phase difference between a reference signal and the signal of said second junction point while using the signal of said first junction point as said reference signal;
- a second phase-difference detecting circuit which detects a phase difference between said reference signal and the signal of said third junction point; and
- a differential amplification circuit for performing differential amplification on the outputs of the first and second phase-difference detecting circuits.

7. An acceleration sensor according to claim 6, further comprising a phase adjusting circuit for adjusting the phase of said reference signal which is input to the first and second phase-difference detecting circuits.

8. An acceleration sensor according to claim 1, wherein said phase-difference-signal processing circuit comprises:
- a first phase-difference detecting circuit which detects a phase difference between a reference signal and the signal of said second junction point while the signal of said sixth junction point to which said phase-shift circuit and said amplifying circuit in said feedback-signal processing circuit are connected is used as said reference signal;
- a second phase-difference detecting circuit which detects a phase difference between said reference signal and the signal of said third junction point; and
- a differential amplification circuit for performing differential amplification on the outputs of the first and second phase-difference detecting circuits.

9. An acceleration sensor according to claim 8, further comprising a phase adjusting circuit for adjusting the phase of said reference signal which is input to the first and second phase-difference detecting circuits.

10. An acceleration sensor according to claim 4, wherein at least one of said first and second phase-difference detecting circuits includes an R-S flip-flop.

11. An acceleration sensor comprising:
- first and second piezoelectric vibrators in which reverse stresses are generated by acceleration;
- a bridge circuit that includes a first impedance circuit including the first piezoelectric vibrator, a second impedance circuit including the second piezoelectric vibrator, a first load impedance circuit including a first capacitor, and a second load impedance circuit including a second capacitor, said first impedance circuit and said second impedance circuit are connected to a fourth junction point, said first impedance circuit and said first load impedance circuit are connected to a second junction point, said second impedance circuit and said second load impedance circuit are connected to a third junction point, and said first load impedance circuit and said second load impedance circuit are connected to a first junction point having a potential used as a reference potential;
- a voltage-dividing impedance circuit provided between said second junction point and said third junction point;
- a feedback-signal processing circuit for feeding back the signal of a voltage-dividing point of said voltage-dividing impedance circuit to said first junction point; whereby an oscillating circuit is provided; and
- a phase-difference-signal processing circuit which detects an oscillation-output-phase difference between said second junction point and said third junction point and which outputs an acceleration-detection signal.

12. An acceleration sensor according to claim 11, wherein said feedback-signal processing circuit comprises:
- an amplifier for amplifying the signal of the voltage-dividing point; and
- a phase-shift circuit for shifting the phase of the feedback signal.

13. An acceleration sensor according to claim 11, wherein said voltage-dividing impedance circuit is a voltage-dividing circuit including a plurality of resistors connected in series.

14. An acceleration sensor according to claim 11, wherein said phase-difference-signal processing circuit comprises:
- a first phase-difference detecting circuit which detects a phase difference between a reference signal and the signal of said second junction point while using the signal of the voltage-dividing point as said reference signal;
- a second phase-difference detecting circuit which detects a phase difference between said reference signal and the signal of said third junction point; and
- a differential amplification circuit for performing differential amplification on the outputs of the first and second phase-difference detecting circuits.

15. An acceleration sensor according to claim 14, further comprising a phase adjusting circuit for adjusting the phase of said reference signal which is input to the first and second phase-difference detecting circuits.

16. An acceleration sensor according to claim 11, wherein said phase-difference-signal processing circuit comprises:
- a first phase-difference detecting circuit which detects a phase difference between a reference signal and the signal of said second junction point while using the signal of said first junction point as said reference signal;
- a second phase-difference detecting circuit which detects a phase difference between said reference signal and the signal of said third junction point; and
- a differential amplification circuit for performing differential amplification on the outputs of the first and second phase-difference detecting circuits.

17. An acceleration sensor according to claim 16, further comprising a phase adjusting circuit for adjusting the phase of said reference signal which is input to the first and second phase-difference detecting circuits.

18. An acceleration sensor according to claim 11, wherein said phase-difference-signal processing circuit comprises:
- a first phase-difference detecting circuit which detects a phase difference between a reference signal and the signal of said second junction point while the signal of said sixth junction point to which said phase-shift circuit and said amplifying circuit in said feedback-signal processing circuit are connected being is used as said reference signal;
- a second phase-difference detecting circuit which detects a phase difference between said reference signal and the signal of said third junction point; and
- a differential amplification circuit for performing differential amplification on the outputs of the first and second phase-difference detecting circuits.

19. An acceleration sensor according to claim 18, further comprising a phase adjusting circuit for adjusting the phase of said reference signal which is input to the first and second phase-difference detecting circuits.

20. An acceleration sensor according to claim 14, wherein at least one of said first and second phase-difference detecting circuits includes an R-S flip-flop.

* * * * *